L. COHEN.
FREQUENCY METER FOR MEASURING ELECTRICAL CURRENT.
APPLICATION FILED SEPT. 20, 1910.
1,165,850.  Patented Dec. 28, 1915.
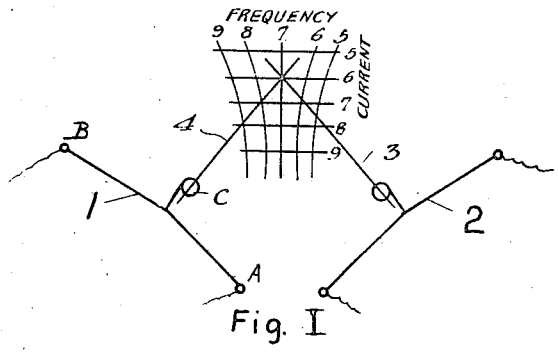
Fig. I
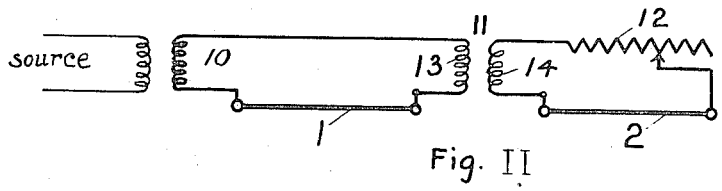
Fig. II
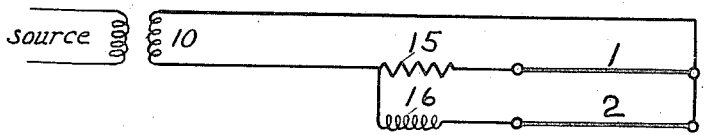
Fig. III
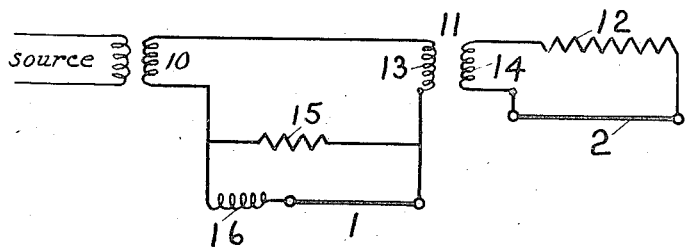
Fig. IV

UNITED STATES PATENT OFFICE.

LOUIS COHEN, OF BRANT ROCK, MASSACHUSETTS, ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, TRUSTEES.

FREQUENCY-METER FOR MEASURING ELECTRICAL CURRENT.

1,165,850.      Specification of Letters Patent.      Patented Dec. 28, 1915.

Application filed September 20, 1910. Serial No. 582,813.

*To all whom it may concern:*

Be it known that I, LOUIS COHEN, a citizen of the United States, residing at Brant Rock, in the State of Massachusetts, have invented a certain new and useful Frequency-Meter for Measuring Electrical Current, of which the following is a specification.

My invention relates generally to electrical indicating apparatus, and especially to instruments for indicating the current strength and frequency of alternating current, the primary objects of the invention being to provide for a continuous and direct indication of the value of both current and frequency at all times.

The invention is illustrated in simple form in the accompanying drawing, in which—

Figure I is a diagram indicating the essentials of the instrument and Figs. II, III, and IV, are diagrams of electric circuits showing three different methods of use of the instrument.

Current indicating instruments heretofore have indicated the current without regard to change in frequency. I provide herein means to show both current and frequency values by combining the motions of two indicating pointers, each of which changes its position with change of current, but one of which, for a given current has the relative amount of its motion increased by an increase in frequency, and the other of which has its relative motion decreased by increase of frequency and vice versa. We may also produce the same result, though not so effectively, by arranging the circuits so that the position of one indicator varies with the current and the frequency, while the position of the other indicator varies with the current but is independent of the frequency. In either case the indicator at all times shows directly both the current value and the frequency value. Thus in Fig. I, reference numerals 1 and 2 indicate the hot wire such as used in the ordinary hot wire ammeter, it being understood that the wire 1 is suspended between supports A and B and by reason of its change of length and corresponding change in amount of deflection, it actuates a small pulley C which carries a pointer 4. I use two such wires 1 and 2, carrying the current to be measured and two of the pointers 3 and 4, arranged so that their projections intersect, as shown. The indication is produced by the intersection of the two pointers, which travels in all directions across a calibrated scale, conventionally shown in Fig. I, and the exact form of the lines of which will of course always depend upon the constants of each particular instrument. If the same current passes through the hot wires 1 and 2, the deflections of the needles 3 and 4 will be the same; and when the current changes, the change in deflection will be the same for both needles. Consequently the point of intersection for the needles will travel along a straight line, as for instance the calibrated vertical line 7.

It is not necessary that the current in the two hot wires 1 and 2 be the same. If the current in wire 1, for example, be less than the current in wire 2, the point of intersection of the pointers 3 and 4 will nevertheless move when currents change in the same proportion and will still indicate respectively the current and frequency changes by resolving the motion into vertical and horizontal components. A proportional change in current will rotate the pointers 3 and 4 proportionate amounts, so that the apparent point of intersection will move so as to indicate the change by the vertical movement for current and by the horizontal movement for frequency.

If the current in one wire be dependent upon, or a function of the frequency of the current, it is evident that a change in frequency will produce a change in the deflection of the needle 3 for example, and this will shift the point of intersection of the two pointers away from the vertical line 7 to the left or right, depending upon whether the frequency increases or diminishes, say to the straight line 5. The instrument is so calibrated that the vertical lines such as 5, 6, 7, 8, and 9, directly indicate each a definite frequency, while said lines are marked along their length by their intersections with the horizontal lines, 5, 6, 7, 8 and 9, to indicate strength of current. So long as the frequency remains constant, the point of intersection of the two needles will be shifted, by changes in current, up and down the particular vertical line 5, 6, 7, etc., which corresponds to that frequency; but if the frequency changes, the point of intersection will shift to a new frequency line.

Of course there are numerous ways to make the current in one of the wires and therefore the deflection of one of the needles a function of the frequency. For example, in Fig. II, 10 represents a coil coupled to the source of the current whose frequency is to be determined, and 1 and 2 again represent the two hot wires of Fig. I, 11 being a transformer of which the primary and secondary are coils 13 and 14, and 12 is a resistance which of course can be given any value. If the current in 10 be I the current in the secondary circuit 14, 12, 2 will be $$\frac{M\frac{dI}{dt}}{\sqrt{R^2+p^2L^2}} = \frac{MpI}{\sqrt{R^2+p^2L^2}},$$

(M being the mutual inductance, R the resistance, L the self inductance of the secondary circuit, and $p$ is $2\pi \times$ frequency). If we make R large as compared with $p$L, then the current in the secondary circuit will be $$\frac{MpI}{R},$$

and the movement of the point of intersection of the two needles in Fig. I will be proportional to the ratio of the current flowing in the two hot wires, that is $$\frac{Mp}{R},$$

and therefore proportional to the frequency.

Another method of making the movement of one needle proportional to frequency is indicated in Fig. III, where the current induced in 10 is divided into two branches one of which contains resistance 15 and the other of which contains inductance 16, and very small resistance. The hot wires 1 and 2 are inserted respectively in these branches, and it is evident that the current in branch 1, 15, will be inversely proportional to R, while the current in branch 2, 16, will be inversely proportional to $p$L, wherefore the relative deflection of the point of intersection of the needles will be proportional to the frequency.

In the above arrangement however, the shifting of the point of intersection due to a small change of frequency would be very small, and the indicating scale difficult to read. Wherefore I prefer to use a combination of the above two methods, as indicated in Fig. IV. Here the current to be measured, induced in the coil 10, is passed through the two branch circuits 15 and 16, 1, and by the transformer 11, the induced current is passed through circuit 14, 12, 2, containing the second hot wire. As shown above, the current in the wire 2 will be directly proportional to the frequency, that is $K_1 p I$, while the current in hot wire 1 will be inversely proportional to the frequency, that is $$\frac{K_2 I}{p},$$

(where $K_1$ and $K_2$ are constants depending on the constants of the circuits). The ratio of these two currents in the wires 1 and 2, is shown by the position of the point of intersection of the two needles; and it will therefore be proportional to the square of the frequency, that is $K_1 p I$ divided by $$\frac{K_2 I}{p},$$

or $$\frac{K_1 p^2}{K_2};$$

and hence a small change in frequency will produce a very large change in the movement of the point of intersection of the indicating needles.

It will be understood that my invention is not limited to this particular arrangement of the circuits, nor to any particular kind of indicating instrument, so long as there are two indicators operating conjointly and one having its motion a function of frequency while the other has its motion a function of the current, or the motion of one indicator is a function of both current and frequency while that of the other varies with current only, being independent of frequency. It will also be noted that I prefer to have the motions of both the pointers functions of frequency but reverse functions,—that is one motion varies directly with frequency and the other inversely as the frequency, in which case the scale is not crowded and is easily read.

Having thus described my invention and illustrated its use, I claim the following:

1. An indicating instrument for measuring alternating electric current, comprising two conductors carrying parts of such current, a plurality of pointers and means to move each of such pointers upon a change of current and resulting change of physical condition in one of said conductors, and a scale indicating frequency and current by the relative positions of said pointers, and means to change the current in one of said conductors proportionally to change of frequency of the current, while the position of the other pointer changes only with strength of current, substantially as described.

2. A frequency meter comprising a composite scale showing frequency and current, two pointers mounted to move over said scale and electrical means to move said pointers respectively by changes in strength of the current to be measured and by changes in frequency of the current to be measured.

3. An ammeter having a composite scale, a pointer moving over said scale to indicate changes in current and another pointer moving over said scale to indicate changes in frequency of the current, two conductors for parts of the current to be measured, and means operated by changes in the physical condition of said conductors due to changes of current therein to move said pointers respectively, the current in one conductor being proportional to the frequency of the current to be measured.

4. An indicating instrument for alternating current comprising two conductors and means to divide the current between them, one of said conductors having a proportion of current dependent upon frequency and the other having a proportion not dependent upon frequency, and a composite scale and pointers moved over the scale by said conductors respectively and arranged to indicate by their relative position, substantially as described.

5. A hot wire ammeter having a composite scale and two coöperating indicating arms, electric means to move said arms, one by changes in current strength, and the other by changes in current frequency, substantially as described.

6. An instrument for simultaneously indicating the current strength and the frequency of alternating currents, comprising two conductors whose length is changed by change in current therein, means to pass through one of said conductors a flat proportion of the current to be measured, and means to pass through the other conductor an amount of the current proportional to the frequency of the current, a pair of pointers respectively moved by changes in the condition of said conductors and indicating by their relative positions.

In testimony whereof I have hereunto signed my name in the presence of the two subscribed witnesses.

LOUIS COHEN.

Witnesses:
 JESSIE E. BENT,
 FLORENCE M. LYON.